US012715008B2

(12) United States Patent
Limon

(10) Patent No.: US 12,715,008 B2
(45) Date of Patent: Aug. 25, 2026

(54) CONTINUOUS FLOW CENTRIFUGATION WITH CONTROLLED POSITIVE PRESSURE CASCADE FOR AVOIDING CROSS-CONTAMINATION

(71) Applicant: THERMO ELECTRON LED S.A.S., Saint Herblain (DE)

(72) Inventor: Benoit Limon, Courtaboeuf (FR)

(73) Assignee: Thermo Electron LED S.A.S., Saint Herblain (FR)

(*) Notice: Subject to any disclaimer, the term of this patent is extended or adjusted under 35 U.S.C. 154(b) by 654 days.

(21) Appl. No.: 18/259,601

(22) PCT Filed: Dec. 14, 2021

(86) PCT No.: PCT/EP2021/085634
§ 371 (c)(1),
(2) Date: Jun. 28, 2023

(87) PCT Pub. No.: WO2022/144170
PCT Pub. Date: Jul. 2, 2022

(65) Prior Publication Data

US 2024/0066531 A1 Feb. 29, 2024

(30) Foreign Application Priority Data

Dec. 30, 2020 (EP) .................................... 20306714

(51) Int. Cl.
*B04B 13/00* (2006.01)
*B04B 11/02* (2006.01)

(52) U.S. Cl.
CPC .............. *B04B 13/00* (2013.01); *B04B 11/02* (2013.01)

(58) Field of Classification Search
CPC ............ B04B 13/00; B04B 11/02; B04B 9/12
(Continued)

(56) References Cited

U.S. PATENT DOCUMENTS 3,604,769 A * 9/1971 Latham, Jr. ............... B04B 9/12 384/476
4,011,972 A * 3/1977 Pederson ............... B04B 15/08 494/61

(Continued)

FOREIGN PATENT DOCUMENTS

| | | | |
|---|---|---|---|
| EP | 2 524 734 A1 | 11/2012 | |
| EP | 3 666 389 A1 | 6/2020 | |
| WO | WO-2009010631 A1 * | 1/2009 | ............. B04B 11/04 |

OTHER PUBLICATIONS

International Search Report and Written Opinion of the International Searching Authority issued in International Patent Application No. PCT/EP2021/085634, dated Apr. 12, 2022.

*Primary Examiner* — Charles Cooley
(74) *Attorney, Agent, or Firm* — BakerHostetler

(57) ABSTRACT

A control system for a centrifuge is disclosed, that comprises: a controller that receives a first pressure signal indicative of a first pressure of a product flowing into or out of the centrifuge, and a second pressure signal indicative of a second pressure of an operating fluid flowing into or out of the centrifuge. The controller is configured to: determine a first pressure difference between the first pressure and the second pressure; an in response to the first pressure difference dropping below a first predetermined offset, output a first control signal that causes a back pressure of the product flowing out of the centrifuge to increase.

16 Claims, 4 Drawing Sheets

(58) Field of Classification Search
USPC ....... 494/1–6, 10–11, 23, 25–30, 56, 37, 38, 494/41
See application file for complete search history.

(56) References Cited

U.S. PATENT DOCUMENTS

| | | | | |
|---|---|---|---|---|
| 4,205,779 | A * | 6/1980 | Jacobson | H02K 5/161 494/83 |
| 6,080,098 | A * | 6/2000 | Borgstrom | B04B 15/06 494/37 |
| 6,837,842 | B1 * | 1/2005 | Dellden | B04B 1/08 494/10 |
| 7,485,084 | B2 * | 2/2009 | Borgstrom | B04B 11/02 494/56 |
| 7,901,342 | B2 * | 3/2011 | Tobita | B04B 15/00 494/25 |
| 9,405,836 | B2 * | 8/2016 | Spiegel | G06F 16/9535 |
| 10,773,263 | B2 * | 9/2020 | Spiegel | G06F 3/0488 |
| 2006/0009341 | A1 * | 1/2006 | Tobita | B04B 1/02 494/61 |
| 2009/0197752 | A1 * | 8/2009 | Spiegel | B04B 7/06 494/7 |
| 2010/0075823 | A1 | 3/2010 | Toi et al. | |
| 2012/0220441 | A1 * | 8/2012 | Spiegel | G06F 16/9535 494/83 |
| 2015/0202635 | A1 * | 7/2015 | Spiegel | B04B 9/12 494/14 |
| 2018/0117601 | A1 * | 5/2018 | Borgström | B01D 17/0217 |
| 2024/0066531 | A1 * | 2/2024 | Limon | B04B 11/02 |

* cited by examiner

CONTINUOUS FLOW CENTRIFUGATION WITH CONTROLLED POSITIVE PRESSURE CASCADE FOR AVOIDING CROSS-CONTAMINATION

CROSS-REFERENCE TO RELATED APPLICATIONS

The present application is the National Stage of International Patent Application No. PCT/EP2021/085634, filed Dec. 14, 2021, which claims the benefit of European Patent Application No. 20306714.5, filed Dec. 30, 2020, the disclosures of which are incorporated herein by reference in their entireties for any and all purposes.

TECHNICAL FIELD

The present invention relates generally to continuous centrifugation of products, and, more particularly, to methods of controlling centrifuge system to prevent cross-contamination of the products.

BACKGROUND

Continuous-flow centrifuges typically include a rotor having an input port and an output port, and stationary connections that provide the rotor with a sample is to be processed, and that accept separated sample components from the rotor. Because the rotor rotates relative to these stationary connections, seal assemblies are used to couple the connections to the spinning rotor. During centrifugation, the sample flows through a stationary connection and seal assembly into the rotor, where it is separated into its component parts by density due to the g-forces generated in the rotor.

To reduce heat and prevent damage to the seal assembly, union seals that join the ports of the rotor to the stationary connections are cooled and lubricated by one or more operating fluids. The operating fluids are typically provided to the seal assemblies under pressure by external cooling and lubricating systems. However, because the operating fluids are under pressure, if any of the seals in the seal assembly are defective, the sample components being processed by the centrifuge may become contaminated by the operating fluids.

One way of determining if an operating fluid may be contaminating the products in the centrifuge is by detecting leaks. Leakage of an operating fluid may be detected, for example, by monitoring a reservoir of the operating fluid for the level or weight of its contents. However, even when leaks are successfully detected in this manner, detection of the leak does not prevent contamination. Rather, detection merely lets the operator know the products could be contaminated.

Thus, there is a need for improved systems, methods, and computer program products that detect and prevent contamination in continuous centrifugation systems.

SUMMARY

The present invention overcomes the foregoing and other shortcomings and drawbacks of detecting contamination in separated products heretofore known for use in centrifugation. While the present invention will be discussed in connection with certain embodiments, it will be understood that the present invention is not limited to the specific embodiments described herein.

In an embodiment of the present invention, a control system for a centrifuge is provided. The control system includes a controller that receives a first pressure signal indicative of a first pressure of a product flowing into or out of the centrifuge, and a second pressure signal indicative of a second pressure of an operating fluid flowing into or out of the centrifuge. The controller is configured to determine a first pressure difference between the first pressure and the second pressure, and in response to the first pressure difference dropping below a first predetermined offset, output a first control signal that causes a backpressure of the product flowing out of the centrifuge to increase.

In an aspect of the present invention, the controller is configured to output a second control signal that causes the backpressure of the product flowing to out of the centrifuge to decrease in response to the first pressure difference rising above a second predetermined offset.

In another aspect of the present invention, the first control signal causes the backpressure to increase by closing a valve, and the second control signal causes the backpressure to decrease by opening the valve.

In another aspect of the present invention, the first predetermined offset is less than or equal to the second predetermined offset.

In another aspect of the invention, the first pressure is of the product flowing into the centrifuge, and the controller is configured to receive a third pressure signal indicative of a third pressure of the product flowing out of the centrifuge, determine a second pressure difference between the first pressure and the third pressure, and in response to the second pressure difference dropping below a third predetermined offset, output a third control signal that causes an increase in the backpressure of the product flowing into the centrifuge.

In another aspect of the present invention, the third control signal causes the increase in the backpressure of the product flowing into the centrifuge by closing the valve.

In another aspect of the invention, the second pressure is of a lubricant, and the controller is further configured to receive a fourth pressure signal indicative of a fourth pressure of a coolant, determine a third pressure difference between the first pressure and the fourth pressure, and in response to either the first pressure difference dropping below the first predetermined offset, or the third pressure difference dropping below a fourth predetermined offset, output the first control signal.

In another aspect of the present invention, the controller is further configured to store data indicative of the first pressure, the second pressure, and an operational state of the centrifuge at each of a plurality of sample times during which the centrifuge is in operation.

In another aspect of the present invention, the controller determines that a component of the product is free of contamination based on the first pressure difference failing to drop below a fifth predetermined offset during a period of time while the centrifuge has been processing the product.

In another aspect of the present invention, the fifth predetermined offset is less than the first predetermined offset, and greater than zero.

In another embodiment of the present invention, a method of controlling a centrifuge is provided. The method includes receiving the first pressure signal indicative of the first pressure of the product flowing into or out of the centrifuge, receiving the second pressure signal indicative of the second pressure of the operating fluid flowing into or out of the centrifuge, determining the first pressure difference between the first pressure and the second pressure, and in response to the first pressure difference dropping below the first predetermined offset, increasing the backpressure of the product flowing out of the centrifuge.

In another aspect of the present invention, the method further includes decreasing the backpressure of the product flowing out of the centrifuge in response to the first pressure difference rising above the second predetermined offset.

In another aspect of the present invention, increasing the backpressure comprises closing the valve, and decreasing the backpressure comprises opening the valve.

In another aspect of the invention, the first predetermined offset is less than or equal to the second predetermined offset.

In another aspect of the invention, the first pressure is of the product flowing into the centrifuge, and the method further includes receiving the third pressure signal indicative of the third pressure of the product flowing out of the centrifuge, determining the second pressure difference between the first pressure and the third pressure, and in response to the second pressure difference dropping below a third predetermined offset, increasing the backpressure of the product flowing into the centrifuge.

In another aspect of the present invention, increasing the backpressure of the product flowing into the centrifuge comprises closing the valve.

In another aspect of the invention, the second pressure is of the lubricant, and the method further includes receiving the fourth pressure signal indicative of the fourth pressure of the coolant, determining the third pressure difference between the first pressure and the fourth pressure, and in response to either the first pressure difference dropping below the first predetermined offset, or the third pressure difference dropping below a fourth predetermined offset, increasing the backpressure of the product flowing out of the centrifuge.

In another aspect of the present invention, the method further includes storing data indicative of the first pressure, the second pressure, and the operational state of the centrifuge at each of the plurality of sample times during which the centrifuge is in operation.

In another aspect of the present invention, the method further includes determining a component of the product is free of contamination based on the first pressure difference failing to drop below the fifth predetermined offset during the period of time while the centrifuge has been processing the product.

In another aspect of the present invention, the fifth predetermined offset less than the first predetermined offset, and greater than zero.

In another embodiment of the invention, a computer program product for controlling the centrifuge is provided. The computer program product includes a non-transitory computer-readable storage medium, and program code stored on the non-transitory computer-readable storage medium. The program code is configured so that, when it is executed by one or more processors, it causes the to one or more processors to receive the first pressure signal indicative of the first pressure of the product flowing into or out of the centrifuge, receive the second pressure signal indicative of the second pressure of the operating fluid flowing into or out of the centrifuge, determine the first pressure difference between the first pressure and the second pressure, and in response to the first pressure difference is dropping below the first predetermined offset, increase the backpressure of the product flowing out of the centrifuge.

BRIEF DESCRIPTION OF THE DRAWINGS

The accompanying drawings, which are incorporated in and constitute a part of this specification, illustrate embodiments of the present invention and, together with a general description of the present invention given above, and the detailed description given below, serve to explain the present invention.

DETAILED DESCRIPTION

Embodiments of the present invention are directed to methods and systems for controlling continuous flow centrifuges. A control system monitors the pressures of a sample suspension being fed into the centrifuge and one or more separated components being discharged from the centrifuge, collectively referred to as "products". The control system also monitors the pressures of operating fluids (e.g., coolant and lubricant) used to cool and lubricate the seals and bearings of the centrifuge. Based on one or more of these monitored pressures, the control system regulates the pressure of the product being discharged from the centrifuge to maintain a positive pressure cascade across the seals. This positive pressure cascade prevents the input product or any output products from being contaminate in case of seal leakage. That is, because input and output products are each maintained at a pressure that is higher than the pressure of any of the operating fluids, the operating fluids cannot penetrate into areas of the seal assembly occupied by the products.

Each of multiple operational parameters, such as the characteristics and flow rate of product and the speed of the rotor, may affect the pressure of the product flowing into the centrifuge and the product flowing out of the centrifuge. However, by maintaining a positive product pressure relative to the operating fluid pressures, the control system prevents product contamination at either the input or to output of the centrifuge under all operational conditions. In addition to controlling pressure, the control system may also record operational data to document a lack of contamination risk for product validation and to facilitate problem tracing.

Figure 1:
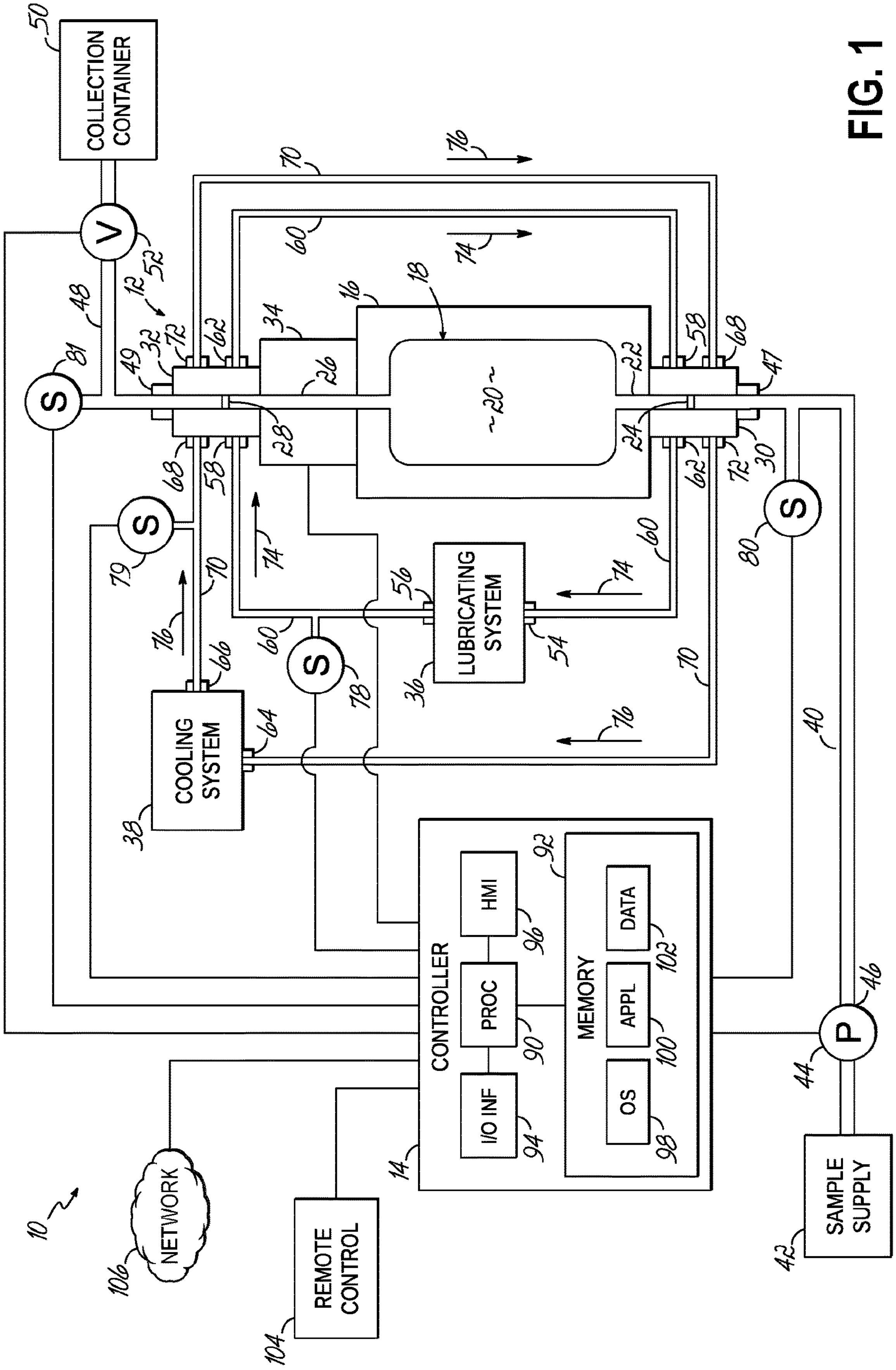
FIG. 1 is a schematic view of an exemplary operating environment including a controller and a centrifuge having upper and lower seal assemblies in accordance with an exemplary embodiment of the present invention.

FIG. 1 depicts an operating environment 10 including a continuous flow centrifuge 12 and a centrifuge controller 14 in accordance with an exemplary embodiment of the present invention. The centrifuge 12 may include a rotor housing 16 and a rotor 18 having a rotor body 20 that rotates within the rotor housing 16. The rotor 18 may further include a hollow lower shaft 22 having an input port 24, and a hollow upper shaft 26 having an output port 28. The rotor 18 may be operatively coupled to a lower seal assembly 30 by the lower shaft 22, and an upper seal assembly 32 by the upper shaft 26. A drive unit 34 may be coupled to the upper shaft 26 of rotor 18 to provide rotation to the rotor 18. Each of the seal assemblies 30, 32 may be provided with lubricant (e.g., oil) by a lubricating system 36 and coolant (e.g., chilled water) by a cooling system 38.

The lower seal assembly 30 may fluidically couple the input port 24 of rotor 18 to a feed line 40. The lower seal assembly 30 may be configured to allow the rotor 18 to rotate relative to the feed line 40. The feed line 40 may provide a flow of product to the rotor 18 by fluidically coupling the input port 24 of rotor 18 to a product supply 42, e.g., a container of a biological suspension to be separated into component parts. The product supply 42 may be operatively coupled to the feed line 40 by a pump 44 (e.g., a peristaltic pump) having an output port 46. The to pump 44 may provide a controlled amount or flow rate of the product to the feed line 40 under pressure in response to a control signal from the controller 14. The output of the feed line 40 may be coupled to the lower seal assembly 30 by a product input port 47.

The upper seal assembly 32 may fluidically couple the output port 28 of is rotor 18 to an output line 48, and is configured to allow the rotor 18 to rotate relative to the output line 48. The output line 48 may fluidically couple a product output port 49 of seal assembly 32 to a component collection container 50. A valve 52 operatively coupled to the output line 48 may regulate the flow of product between the output port 49 of seal assembly 32 and the collection container 50. By way of example, the valve 52 may be a proportional controlled pinch valve that is used to control back pressure on the output line 48. To this end, the valve 52 may be selectively and incrementally opened and closed by the controller 14 to provide a controlled amount of resistance to the flow of product from the output port 49 of seal assembly 32 into the collection container 50.

The drive unit 34 may be configured to selectively apply torque to the rotor 18 through the upper shaft 26, thereby causing the rotor 18 to rotate within the rotor housing 16 in response to a rotation control signal from the controller 14. The drive unit 34 may include a high-frequency induction motor, or other suitable source of torque, that spins the rotor 18, for example, at speeds up to 40,000 Rotations Per Minute (RPM). This rotation may allow the rotor 18 to generate a to Relative Centrifugal Force (RCF) of, for example, up to 118,000×g.

The lubricating system 36 may include an input port 54 and output port 56, as well as one or more pumps, filters, heat exchangers, reservoirs, etc. (not shown) configured to provide lubricant under pressure to the seal assemblies 30, 32. Lubricant lines 60 may fluidically couple the output port 56 of lubricating is system 36 to respective lubricant input ports 58 of each seal assembly 30, 32. The lubricant lines 60 may also fluidically couple a lubricant output port 62 of each seal assembly 30, 32 to the input port 54 of lubricating system 36. Thus, once the lubricant has circulated through the seal assemblies 30, 32, it may return to the lubricating system 36 through the input port 54 thereof.

The cooling system 38 may include an input port 64 and an output port, as well as one or more pumps, filters, heat exchangers, reservoirs, etc. (not shown) configured to provide coolant under pressure to the seal assemblies 30, 32. In a similar manner as described above for the lubricating system 36, coolant lines 70 may fluidically couple the output port 66 of cooling system 38 to a respective coolant input port 68 of each seal assembly 30, 32. The coolant lines 70 may also fluidically couple a coolant output port 72 of each seal assembly 30, 32 to the input port 64 of cooling system 38. Thus, once the coolant has circulated through the seal assemblies 30, 32, it may return to the cooling system 38 through the coolant system input port 64.

It should be understood that the lubricant and coolant lines may connect the seal assemblies 30, 32 in a series configuration (as shown), in a parallel configuration, or in any other suitable configuration. It should be further understood that the direction of flow of the operating fluids indicated by arrows 74, 76 is exemplary only, and could be changed in alternative embodiments of the invention.

Pressure sensors 78-81 may be operatively coupled to one or more of the feed line 40, output line 48, lubricant lines 60, and coolant lines 70. The pressure sensors may be configured to provide the controller 14 with pressure signals indicative of the pressure in each of the respective lines to which the respective pressure sensors are coupled. For example, a lubricant pressure sensor 78 may be operatively coupled to the output port 56 of lubricating system 36, a coolant pressure sensor 79 may be operatively coupled to the output port 66 of cooling system 38, a product input pressure sensor 80 may be operatively coupled to the input port 24 of rotor 18, and a product output pressure sensor 81 may be operatively coupled to the output port 28 of rotor 18.

The controller 14 may include a processor 90, a memory 92, an input/output (I/O) interface 94, and a Human Machine Interface (HMI) 96. The processor 90 may include one or more devices selected from microprocessors, micro-controllers, digital signal processors, microcomputers, central processing units, field programmable gate arrays, programmable logic devices, state machines, logic circuits, analog circuits, digital circuits, or any other devices that to manipulate signals (analog or digital) based on operational instructions stored in memory 92. Memory 92 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 90 may operate under the control of an operating system 98 that resides in memory 92. The operating system 98 may manage controller resources so that computer program code embodied as one or more computer software applications 100 residing in memory 92 can have instructions executed by the processor 90. One or more data structures 102 may also reside in memory 92, and may be used by the processor 90, operating system 98, or application 100 to store or manipulate data.

The I/O interface 94 may provide a machine interface that operatively couples the processor 90 to one or more other devices and systems, such as the drive unit 34, pump 44, valve 52, sensors 78-81, a remote control device 104, and a network 106. For example, the I/O interface 94 may include one or more serial or parallel data ports (e.g., a Profibus port), one or more network communication ports (e.g., an Ethernet port or WiFi transceiver), as well as analog input and output ports for sending and receiving analog signals. The application 100 may thereby work cooperatively with the other devices and systems by communicating via the I/O interface 94 to provide the various features, functions, applications, processes, or modules comprising embodiments of the present invention.

The application 100 may have program code that is executed by one or is more external resources, or otherwise rely on functions or signals provided by other system or network components external to the controller 14. Indeed, given the nearly endless hardware and software configurations possible, persons having ordinary skill in the art will understand that embodiments of the present invention may include applications that are located externally to the controller 14, distributed among multiple computers or other external resources, or provided by computing resources (hardware and software) that are provided as a service over the network 106, such as a cloud computing service.

The HMI 96 may be operatively coupled to the processor 90 of controller 14 to allow a user to interact directly with the controller 14 The HMI 96 may include video or alphanumeric displays, a touch screen, a speaker, and any other suitable audio and visual indicators capable of providing data to the user. The HMI 96 may also include input devices and controls such as an alphanumeric keyboard, a pointing device, keypads, pushbuttons, control knobs, microphones, etc., capable of accepting commands or input from the user and transmitting the to entered input to the processor 90. In an embodiment of the present invention, the HMI 96 may include the remote control 104, or otherwise operate in cooperation with the remote control 104, to enable remote operation of the centrifuge 12.

The controller 14 may be operatively coupled to one or more external resources (not shown) via the network 106. External resources may include, but are not limited to, servers, databases, mass storage devices, peripheral devices, cloud-based network services, or any other resource that may be used by the controller 14 to implement features of embodiments of the present invention.

In an embodiment of the invention, the controller 14 may comprise a microcomputer, such as a Windows®-based PC controller. In this embodiment, the HMI 96 may include a touch-sensitive liquid-crystal-display (LCD) panel that provides a graphical user interface (GUI) for operating the centrifuge 12. The controller 14 may also be configured to support 21 CFR Part 11 regulations for electronic records such that operational data is handled with high security and precluded from corruption or falsification. In addition, the controller 14 may be configured to output log data in CSV format via a Universal Serial Bus (USB) port or to a network share folder for data management and analysis by commercially available database or spreadsheet software. The controller 14 may also support Ethernet OPC-DA or Profibus-DP communication for monitoring real time data and remote control operation.

In an embodiment of the present invention, the controller 14 may be connected to an external system, such as an Integrated Process Control (IPC), having a user interface that enables programing of processes for rinsing, feeding, separating, harvesting, cleaning, and sanitizing to be programmed on site. These processes may be executed in a full-auto mode, a semi-auto mode, or a manual mode. The external system may cover the user interface of the centrifuge 12 and control, monitor, and record the full centrifugation process for repeatable sequences without variation. The external system may thereby simplify operator training and reduce procedural errors. The external system may also be CFR 21 Part 11 compliant with remote user management from a centralized Active Directory server, audit trail, historian SQL database, and batch data report.

The external system may communicate real time process data with a site automation system via Object Linking and Embedding (OLE) for Process Control (OPC), and integrate to site network domain and archive files on share folders for full backup. The external system may auto-stop feed when the product supply 42 is empty, include a pinch valve for controlling the product flow path, a tank for harvesting, tanks for feed input and feed output, and instrumentation for measuring conductivity, temperature, absorbance, concentration, density, and mass flow.

Figure 2:
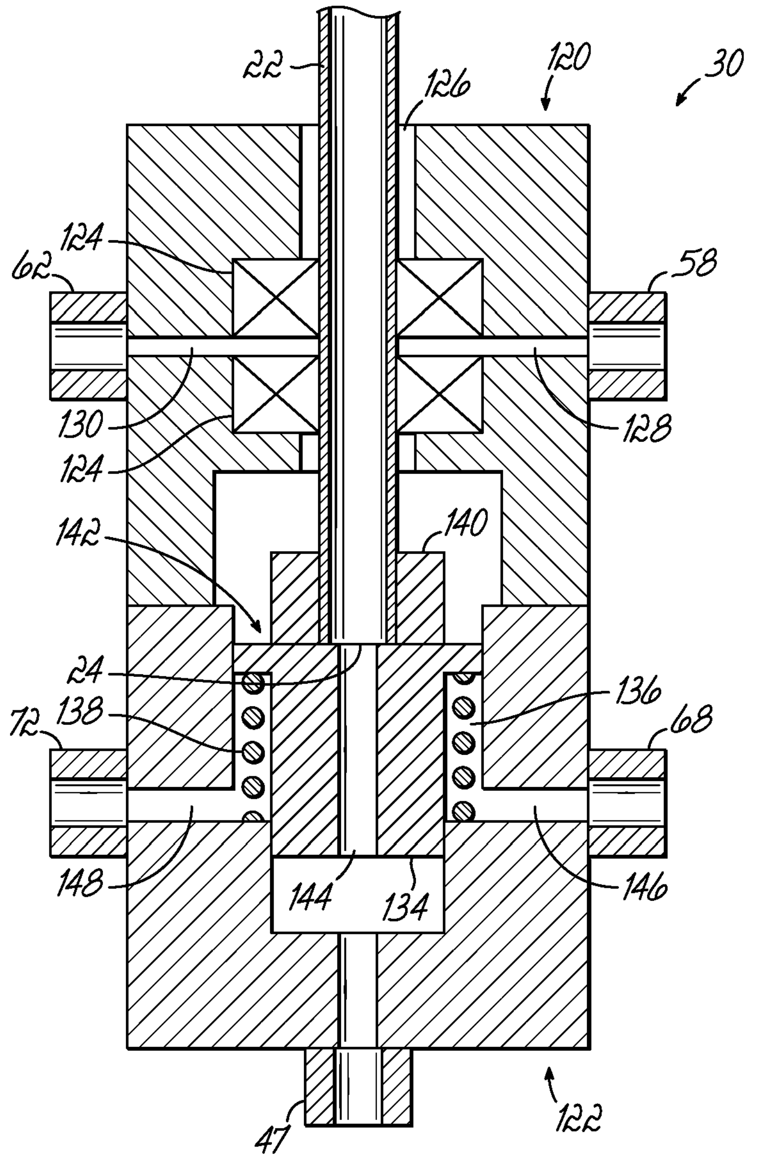
FIG. 2 is a schematic cross-sectional view of the lower seal assembly of FIG. 1.

FIG. 2 depicts an exemplary lower seal assembly 30 in accordance with an embodiment of the present invention that includes a shaft seal sub-assembly 120 and a union seal sub-assembly 122. The shaft seal subassembly 120 may to include one or more shaft seals 124 that axially locate the lower shaft 22 of rotor 18 within a shaft channel 126 and prevent lubricant from leaking past the shaft 22. The lubricant input port 58 and the lubricant output port 62 of lower seal assembly 30 may be fluidically coupled to the shaft seals 124 by respective lubricant channels 128, 130. The shaft seals 124 may thereby receive lubricant from the is lubricating system 36 that lubricates and cools the shaft seals 124 during operation of the centrifuge 12.

The union seal subassembly 122 may include a lower union bearing 134 located in a union bearing channel 136, and an elastic member 138 (e.g., a spring) that urges the lower union bearing 134 in an upward direction within the union bearing channel 136. The lower union bearing 134 may be configured to move within the union bearing channel 136 in response to axially aligned (e.g., upward and downward) forces. In operation, the elastic member 138 may urge the lower union bearing 134 in an upward axial direction and into confronting engagement with an upper union bearing 140. The upper union bearing 140 may be operatively coupled to the lower shaft 22 of rotor 18 and configured to transfer the weight of the rotor 18 to the lower union bearing 134.

The lower union bearing 134 and upper union bearing 140 may be configured to provide a union seal 142 that allows the lower shaft 22 to rotate relative to the lower seal assembly 30. The lower union bearing 134 may include an axially-aligned channel 144 that fluidically couples the input port 24 of rotor 18 to the product input port 47 of lower seal assembly 30 through a lower portion of the union bearing channel 136.

The coolant input port 68 and the coolant output port 72 may be fluidically coupled to an upper portion of the union bearing channel 136 by respective coolant channels 146, 148. Coolant from the cooling system 38 may circulate around the lower union bearing 134 during operation of the centrifuge 12 to remove heat generated by friction between the lower union bearing 134 and upper union bearing 140.

Figure 3:
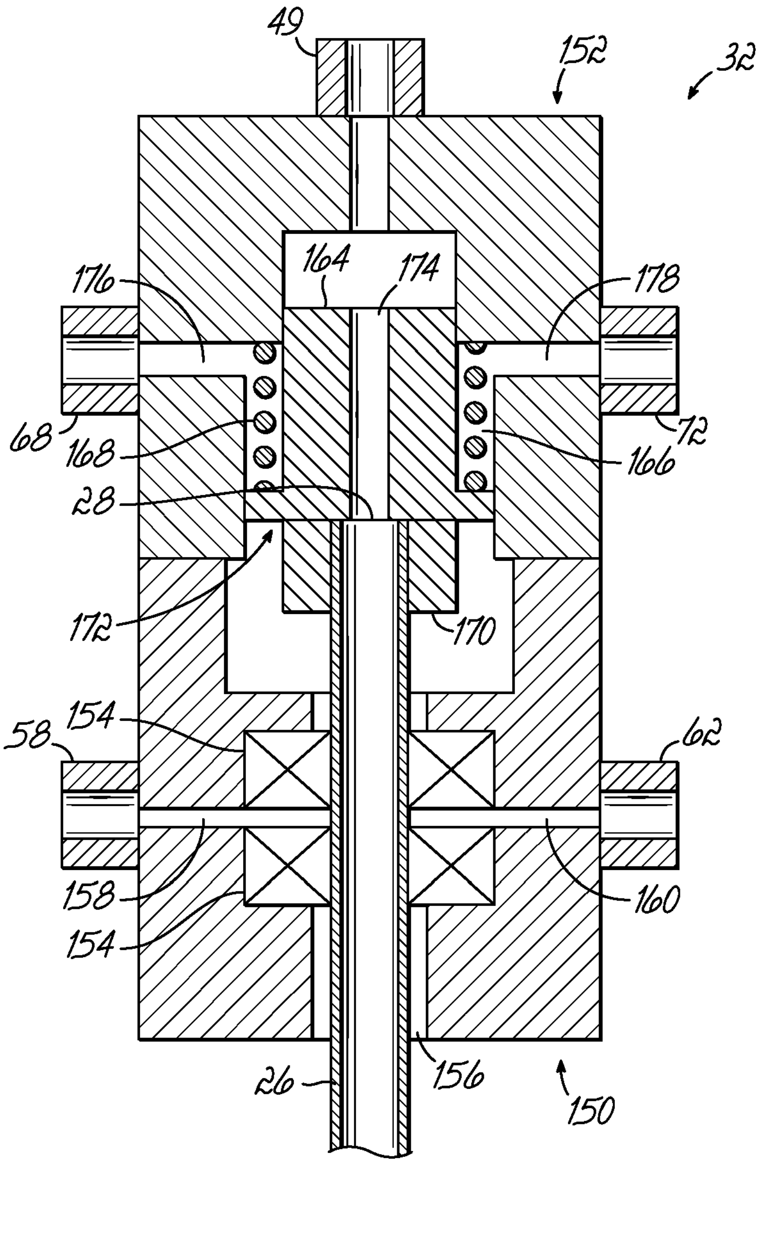
FIG. 3 is a schematic cross-sectional view of the upper seal assembly of FIG. 1.

FIG. 3 depicts an exemplary upper seal assembly 32 in accordance with an embodiment of the present invention. As described in more detail below, certain aspects of the upper seal subassembly 32 may resemble those of an inverted version of the lower seal assembly 30. The upper seal assembly 32 may include a shaft seal sub-assembly 150 and a union seal sub-assembly 152. The shaft seal subassembly 150 may include one or more shaft seals 154 that axially locate the upper shaft 26 of rotor 18 within a shaft channel 156, and prevent lubricant from leaking past the shaft 26. The lubricant input port 58 and the lubricant output port 62 of upper seal assembly 32 may be fluidically coupled to the shaft seals 154 by respective lubricant channels 158, 160. The shaft seals 154 may thereby receive lubricant from the lubricating system 36 that lubricates and cools the shaft seals 154 during operation of the centrifuge 12.

The union seal subassembly 152 may include an upper union bearing 164 located in a union bearing channel 166, and an elastic member 168 (e.g., a spring) that urges the upper union bearing 164 in a downward direction within the union bearing channel 166. The upper union bearing 164 may be configured to move within the union bearing channel 166 in response to axially aligned (e.g. upward and downward) forces. In operation, the elastic member 168 may urge the upper union bearing 164 in a downward axial direction and into confronting engagement with a lower union bearing 170 that is operatively coupled to the upper shaft 26 of rotor 18.

The upper union bearing 164 and lower union bearing 170 may be configured to provide a union seal 172 that allows the upper shaft 26 to rotate relative to the upper seal assembly 32. The upper union bearing 164 may include an axially-aligned channel 174 that fluidically couples the output port 28 of rotor 18 to the product output port 49 of upper seal assembly 32 through an upper portion of the union bearing channel 166.

The coolant input port 68 and the coolant output port 72 may each be fluidically coupled to an upper portion of the union bearing channel 166 by a respective coolant channel 176, 178. Coolant from the cooling system 38 may circulate around the upper union bearing 164 during operation of the centrifuge 12 to remove heat generated by friction between the upper union bearing 164 and lower union bearing 170.

Figure 4:
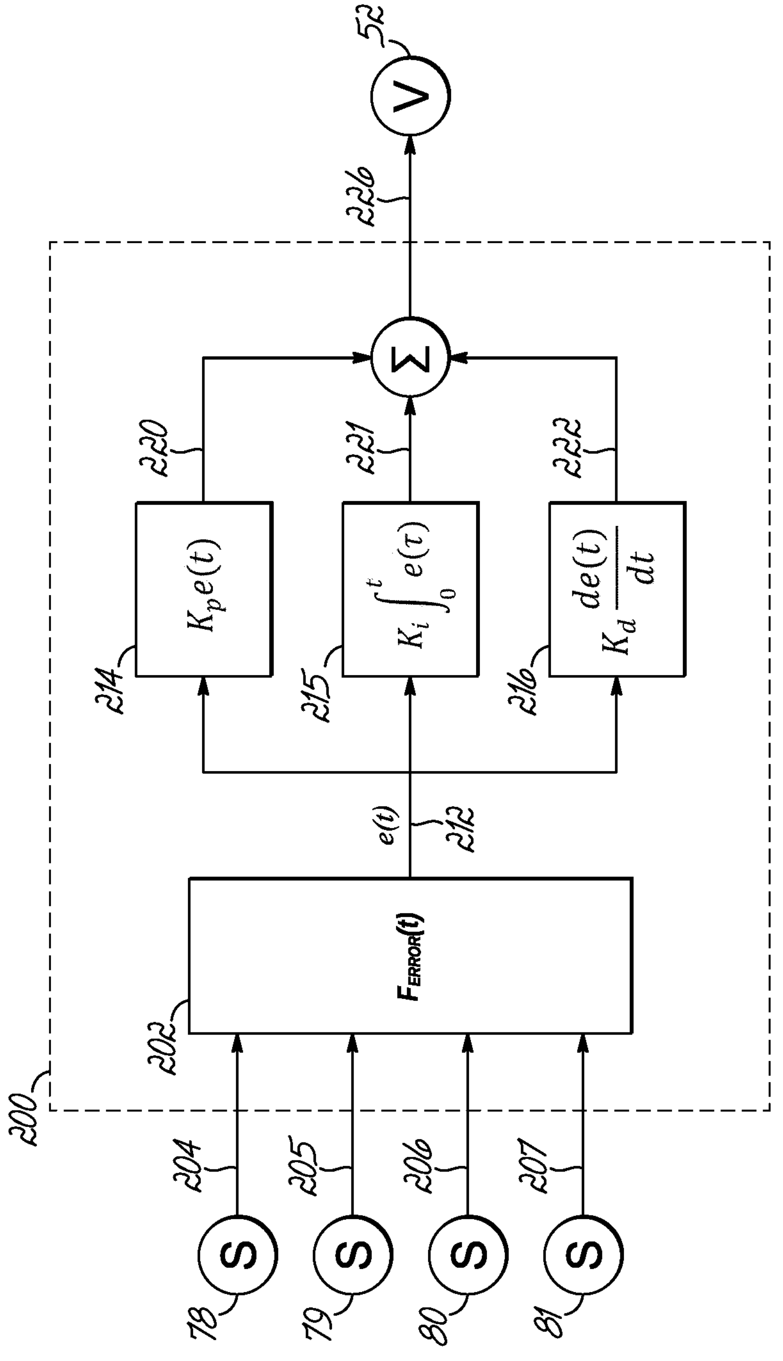
FIG. 4 is a diagrammatic view of a control process that may be implemented by the controller of FIG. 1 to control a pressure of a product being to processed by the centrifuge.

FIG. 4 depicts a control process 200 that may be executed by the controller 14, or another suitable computing device, to control the valve 52. The control process 200 may include an error function module 202 that receives a pressure signal 204-207 indicative of a pressure from each of the respective pressure sensors 78-81, and outputs an error signal 212 based at least in part on the pressure signals 204-207. The error signal 212 may be received by one or more of a proportional module 214, an integral module 215, and a derivative module 216. Each of the modules 214-216 may output a respective signal 220-222 that is summed to generate a control signal 226 which is used to control the valve 52. The control process 200 may thereby provide a proportional-integral-derivative (PID) control system that controls operation of the valve 52.

The error function $F_{ERROR}(t)$ may be configured to maintain one or more predetermined relationships between two or more of the product input pressure, product output pressure, lubricant pressure, and coolant pressure. By way of example, the error function $F_{ERROR}(t)$ may be configured to output zero error when the product input pressure $P_I$ (as indicated by sensor 80) is greater than the coolant pressure $P_C$ (as indicated by sensor 79) by a predetermined offset $\Delta_{I-C}$. That is, when the pressure difference $(P_I-P_C)$ is equal to the predetermined offset $\Delta_{I-C}$. In this case, the error function $F_{ERROR}(t)$ may be provided by:

$$F_{ERROR}(t)=G_{I-C}((P_I-P_C)-\Delta_{I-C}) \quad \text{Eqn. 1}$$

where $G_{I-C}$ is a gain constant.

By way of another example, the error function $F_{ERROR}(t)$ may be to configured to output zero error when the product output pressure $P_O$ (as indicated by sensor 81) is greater than the coolant pressure $P_C$ (as indicated by sensor 79) by a predetermined offset $\Delta_{O-C}$. That is, when the pressure difference $(P_O-P_C)$ is equal to the predetermined offset $\Delta_{O-C}$. In this case, the error function $F_{ERROR}(t)$ may be provided by:

$$F_{ERROR}(t)=G_{O-C}((P_O-P_C)-\Delta_{O-C}) \quad \text{Eqn. 2}$$

where $G_{O-C}$ is another gain constant.

By way of yet another example, the error function $F_{ERROR}(t)$ may be configured to output the minimum error (smallest positive error or largest negative error) between the target product input and coolant pressure difference, and the target product output and coolant pressure difference. In this case, the error function $F_{ERROR}(t)$ may be provided by:

$$F_{ERROR}(t)=\min\begin{bmatrix} G_{I-C}((P_I-P_C)-\Delta_{I-C}), \\ G_{O-C}((P_O-P_C)-\Delta_{O-C}) \end{bmatrix} \quad \text{Eqn. 3}$$

In any case, to control the pressures of the liquids flowing into and out of the seal assemblies, the error function $F_{ERROR}(t)$ may also include additional control features, such as a dead-band, hysteresis, limiting, damping functions, etc., that are not represented in the exemplary equations.

An error signal 212 having a positive value may indicate that the pressure of the product is higher than it needs to be relative to one or more of the lubricant and coolant pressures. In this exemplary scenario, the modules 214-216 may be configured to generate signals 220-222 that, when summed, produce a to control signal 226 which causes the valve 52 to reduce the amount of back pressure. That is, the control signal 226 may cause the valve 52 to open more fully. Opening the valve 52 may reduce the resistance encountered by the liquid being discharged from the centrifuge 12, and thus reduce the backpressure at the product output port 49 of upper seal assembly 32. This decreased back pressure is at the upper seal assembly 32 may propagate through the rotor 18 and cause the pressure of the product at the product input port 47 of lower seal assembly 30 to decrease.

In contrast, an error signal 212 having a negative value may indicate that the pressure of the sample suspension is too low relative to one or more of the lubricant and coolant pressures. In this exemplary scenario, the modules 214-216 may be configured to generate signals 220-222 that, when summed, produce a control signal 226 which causes the valve 52 to increase the amount of back pressure. That is, the control signal 226 may cause the valve 52 to be less fully open, i.e., to partially close. Closing the valve 52 may increase the resistance encountered by the liquid being discharged from the centrifuge 12, and thus increase the backpressure at the product output port 49 of upper seal assembly 32. This increased back pressure at the upper seal assembly 32 may propagate through the rotor 18 and cause the pressure of the product at the product input port 47 of lower seal assembly 30 to increase.

The error function may be configured so that the controller 14 regulates the pressures of the product flowing into and out of the centrifuge, the lubricant, and the coolant so that predetermined relationships between the pressures of these fluids are maintained. For example, the error function may be configured so that the controller maintains the product input pressure at a higher level than the is product output pressure, and the product output pressure at a higher level than the coolant fluid pressure. That is, the product input and output pressures $P_I$, $P_O$ may be controlled so that:

$$P_I>P_O>P_C \quad \text{Eqn. 4}$$

The controller may also maintain the lubricant at a higher pressure than the coolant, i.e., $P_L>P_C$. These relationships may be maintained by controlling one or more of the lubricating system 36, the cooling system 38, the pump 44, and the valve 52. Maintaining these relationships between the different operating pressures may guarantee product integrity with no cross contamination between the product and the operating fluids of the centrifuge.

Embodiments of the present invention may provide good manufacturing practice (GMP) documentation evidence of protection against cross-contamination risk by monitoring and storing measured pressure values during centrifugation. This documentation may provide evidence of a cross-contamination free condition of the product. Coupled with the automatic backpressure adjustment feature and pressure sensor package that monitors a positive pressure across the union seals on the product line at all times, embodiments of the invention may provide sample security evidence, and stream pressure data for verification and audit traceability.

Operational data stored by the system may include batch identity, batch start date and time, an identity of who started the batch, a batch stop date and time, an identity of who stopped the batch, a report generation date, equipment information, product information, flow rates, volumes, temperatures, and pressures of the product and each operating fluid at each of one or more locations in the centrifuge system. Additional operational data stored by the system may include rotor speed, centrifugal force generated, density of the product, concentration of the product, conductivity of the product, or any other suitable data that may be used to characterize operation of the centrifuge 12 and processing of the product. In particular, the controller 14 may sample the pressure signals received from the sensors 78-81 at a plurality of sample times (e.g., 44,100 times per second) over a period of time during which the centrifuge is processing a batch of product. The indicated pressure values captured at each sample time may be stored in a database for use in generating pressure graphs and validating the resulting separated components as contamination free.

In general, the routines executed to implement the embodiments of the invention, whether implemented as part of an operating system or a specific application, component, program, object, module or sequence of instructions, or a subset thereof, may be referred to herein as "computer program code," or simply to "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of is the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium is having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through to a wire). Computer-readable program instructions may be downloaded to a computer, another type of programmable data processing apparatus, or another device from a computer-readable storage medium or to an external computer or external storage device via a network.

Computer-readable program instructions stored in a computer-readable is medium may be used to direct a computer, other types of programmable data processing apparatuses, or other devices to function in a particular manner, such that the instructions stored in the computer-readable medium produce an article of manufacture including instructions that implement the functions, acts, or operations specified in the flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the text of the specification, flowcharts, sequence diagrams, or block diagrams.

The flowcharts and block diagrams depicted in the figures illustrate the architecture, functionality, or operation of possible implementations of systems, methods, or computer program products according to various embodiments of the invention. In this regard, each block in the flowchart or block diagrams may represent a module, segment, or portion of instructions, which comprises one or more executable instructions for implementing the specified logical function or functions.

In certain alternative embodiments, the functions, acts, or operations specified in the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While various aspects in accordance with the principles of the present invention have been illustrated by the description of various embodiments, and while the embodiments have been described in considerable detail, they are not intended to restrict or in any way limit the scope of the present invention to such detail. The various features shown and described herein may be used alone or in any combination. Additional advantages and modifications will readily appear to those skilled in the art. The present invention in its broader aspects is therefore not limited to the specific details, representative apparatus and methods and illustrative examples shown and described. Accordingly, departures may be made sp from such details without departing from the scope of the general inventive concept.

The invention claimed is:

1. A control system for a centrifuge, comprising:
- a controller that receives a first pressure signal indicative of a first pressure of a product flowing into or out of the centrifuge, and a second pressure signal indicative of a second pressure of an operating fluid flowing into or out of the centrifuge, the controller being configured to:
- determine a first pressure difference between the first pressure and the second pressure; and
- in response to the first pressure difference dropping below a first predetermined offset, output a first control signal that causes a backpressure of the product flowing out of the centrifuge to increase.

2. The control system of claim 1, wherein the controller is further configured to:
- in response to the first pressure difference rising above a second predetermined offset, output a second control signal that causes the backpressure of the product flowing out of the centrifuge to decrease.

3. The control system of claim 2, wherein the first control signal causes the backpressure to increase by closing a valve, and the second control signal causes the backpressure to decrease by opening the valve.

4. The control system of claim 2, wherein the first predetermined offset is less than or equal to the second predetermined offset.

5. The control system of claim 1, wherein the first pressure is of the product flowing into the centrifuge, and the controller is further configured to:
- receive a third pressure signal indicative of a third pressure of the product flowing out of the centrifuge;
- determine a second pressure difference between the first pressure and the third pressure; and
- in response to the second pressure difference dropping below a third predetermined offset, output a third control signal that causes an increase in the backpressure of the product flowing into the centrifuge.

6. The control system of claim 5, wherein the third control signal causes the increase in the backpressure of the product flowing into the centrifuge by closing a valve.

7. The control system of claim 1, wherein the second pressure is of a lubricant, and the controller is further configured to:
- receive a fourth pressure signal indicative of a fourth pressure of a coolant;
- determine a third pressure difference between the first pressure and the fourth pressure; and
- in response to either the first pressure difference dropping below the first predetermined offset, or the third pressure difference dropping below a fourth predetermined offset, output the first control signal.

8. The control system of claim 1, wherein the controller is further configured to:
- store data indicative of the first pressure, the second pressure, and an operational state of the centrifuge at each of a plurality of sample times during which the centrifuge is in operation.

9. The control system of claim 1, wherein the controller determines that a component of the product is free of contamination based on the first pressure difference failing to drop below a fifth predetermined offset during a period of time in which the centrifuge has been processing the product, and wherein the fifth predetermined offset is less than the first predetermined offset, and greater than zero.

10. A method of controlling a centrifuge, comprising:
- receiving a first pressure signal indicative of a first pressure of a product flowing into or out of the centrifuge;
- receiving a second pressure signal indicative of a second pressure of an operating fluid flowing into or out of the centrifuge;
- determining a first pressure difference between the first pressure and the second pressure; and
- in response to the first pressure difference dropping below a first predetermined offset, increasing a backpressure of the product flowing out of the centrifuge.

11. The method of claim 10, further comprising:
- in response to the first pressure difference rising above a second predetermined offset, decreasing the backpressure of the product flowing out of the centrifuge, and, wherein increasing the backpressure comprises closing a valve, and decreasing the backpressure comprises opening the valve, or wherein the first predetermined offset is less than or equal to the second predetermined offset.

12. The method of claim 10, wherein the first pressure is of the product flowing into the centrifuge, and further comprising:
- receiving a third pressure signal indicative of a third pressure of the product flowing out of the centrifuge;
- determining a second pressure difference between the first pressure and the third pressure; and
- in response to the second pressure difference dropping below a third predetermined offset, increasing the backpressure of the product flowing into the centrifuge.

13. The method of claim 10, wherein increasing the backpressure of the product flowing into the centrifuge comprises closing a valve.

14. The method of any of claim 10, wherein the second pressure is of a lubricant, and further comprising:
- receiving a fourth pressure signal indicative of a fourth pressure of a coolant;
- determining a third pressure difference between the first pressure and the fourth pressure; and
- in response to either the first pressure difference dropping below the first predetermined offset, or the third pressure difference dropping below a fourth predetermined offset, increasing the backpressure of the product flowing out of the centrifuge.

15. The method of claim 10, further comprising:

storing data indicative of the first pressure, the second pressure, and an operational state of the centrifuge at each of a plurality of sample times during which the centrifuge is in operation.

16. The method of claim 10, further comprising:

determining a component of the product is free of contamination based on the first pressure difference failing to drop below a fifth predetermined offset during a period of time in which the centrifuge has been processing the product, and wherein the fifth predetermined offset is less than the first predetermined offset, and greater than zero.

* * * * *